United States Patent [19]

Bolotin

[11] Patent Number: 5,774,520
[45] Date of Patent: Jun. 30, 1998

[54] DENSITOMETER FOR DETERMINING THE DENSITY DISTRIBUTION AND VARIATION OF DENSITY OF AN OBJECT

[76] Inventor: Herbert Howard Bolotin, 18 Amess Street, North Carlton, Victoria 3054, Australia

[21] Appl. No.: 604,945

[22] PCT Filed: Sep. 1, 1994

[86] PCT No.: PCT/US94/09862

§ 371 Date: May 13, 1996

§ 102(e) Date: May 13, 1996

[87] PCT Pub. No.: WO95/06874

PCT Pub. Date: Mar. 9, 1995

[30] Foreign Application Priority Data

Sep. 2, 1993 [AU] Australia .................................. PM0959

[51] Int. Cl.$^6$ ............................ G01N 23/02; G01N 23/06
[52] U.S. Cl. .................................. 378/50; 378/53; 378/54
[58] Field of Search ................................. 378/50, 53, 54,
  378/56, 57, 86, 88, 89, 120, 146; 250/445 R,
  446, 447, 448, 449, 490, 523, 359, 360,
  363.03, 366, 367, 369, 358.1, 363.01; 364/413.13,
  413.24

[56] References Cited

U.S. PATENT DOCUMENTS

| | | |
|---|---|---|
| 4,284,895 | 8/1981 | Morgan et al. ........................ 250/445 |
| 4,293,912 | 10/1981 | Walters ................................... 364/414 |
| 4,322,684 | 3/1982 | Hounsfield ............................. 324/309 |
| 4,365,339 | 12/1982 | Pavkovich et al. ...................... 378/15 |
| 4,559,597 | 12/1985 | Mullani .................................. 364/414 |
| 4,817,119 | 3/1989 | Ledley et al. ............................. 378/9 |
| 5,008,907 | 4/1991 | Norman et al. .......................... 378/65 |
| 5,097,132 | 3/1992 | Plummer ................................. 250/363 |
| 5,128,864 | 7/1992 | Waggener et al. ..................... 364/413 |
| 5,138,165 | 8/1992 | Petroff .................................... 250/363 |
| 5,265,142 | 11/1993 | Hsieh ....................................... 378/4 |
| 5,296,708 | 3/1994 | Moyers et al. .......................... 250/363 |
| 5,307,264 | 4/1994 | Waggener et al. ..................... 364/413 |
| 5,323,007 | 6/1994 | Wernick et al. ........................ 250/363 |

*Primary Examiner*—Frank G. Font
*Assistant Examiner*—Michael P. Stafira
*Attorney, Agent, or Firm*—Jacobson, Price, Holman & Stern, PLLC

[57] ABSTRACT

A densitometer for determining the density distribution and variation of density of an object such as in vivo bone using a source of annihilation radiation or a source of photons in the energy range between about 200-keV and 1500-keV and a pair of photon detectors for detecting photons emitted in coincidence. The object is positioned between the photon source and one of the detectors, referred to as the "blocked" detector, and the density is determined by comparing the number of coincident photons detected by the blocked and unblocked detectors along the path of photons.

20 Claims, 6 Drawing Sheets

FIG. 1

| | SPA | DPA | DEXA | CT | INVENTION |
|---|---|---|---|---|---|
| Assumes only 2 body components | Y | Y | Y | Y | N |
| Adequately corrects for non-homogeneous fat | N | N | N | Y | Y |
| Type of photons used | One polychromatic X-ray; photons with a given average energy ($^{125}$I source usually) | Two polychromatic X-ray photons of different average energies (often $^{153}$Gd) | Two polychromatic photons of different average energies (X-ray generator) | X-rays; 1 or 2 polychromatic photons of different average energies (X-ray generator) | Monochromatic photons from positron annihilation (511-keV) |
| Tomographic | N | N | N | Y | Y |
| Fixed thickness required | Y | N | N | N | N |
| Beam hardening a problem | Y | Y | Y Greater extent than other prior art | Y Greater extent than other prior art | N |
| Scattering a problem | Y | Y | Y | Y | N |
| Absorptivity depends on chemical make up | Y | Y | Y | Y | N |

DENSITOMETER FOR DETERMINING THE DENSITY DISTRIBUTION AND VARIATION OF DENSITY OF AN OBJECT

BACKGROUND OF THE INVENTION

Because the probability of bone fracture is directly and sensitively dependent on bone density, physicians and radiologists require non-invasive measurement in vivo of the bone density of patients, in order to estimate bone strength, assess and evaluate the presence of osteoporosis (lower than normal bone tissue per unit volume), osteopomalacia (lower than normal bone mineral content), to predict future bone fracture risk, and to evaluate the efficacy of various drug or other bone therapy regimens. Current non-invasive techniques, such as traditional radiographic views, or more quantitative radiographic absorptiometric methods, including dual X-ray absorptiometry (DEXA), single- or dual-photon absorptiometry (SPA or DPA) using X-rays and low-energy gamma-rays, or single- or dual X-ray quantitative computed tomography(QCT, PQCT, or CT), provide some measure of in vivo bone mineral content, bone thickness, or estimates of bone density, but yield only limited information of dubious accuracy, inconsistency among techniques, and non-standardized results.

Present, non-invasive devices that estimate bone qualities (bone mineral content, bone density, bone thickness) in vivo use X-rays or low-energy (equal to or less than about 100-keV) gamma-rays to scan the body part of interest. The fraction of such rays absorbed is assumed to correlate with the density of bone and tissue in the region scanned. However, the absorption of these low energy rays depends not only on the density of the material present in the region scanned, but also on the effective atomic number of the constituents of these entities, the distribution of the different types of tissue (bone, fat, soft tissue, marrow, etc.), and the exact energy of the impinging radiation. These variables affect absorption in ways that cannot be readily disentangled using presently available absorptiometric devices, and, thus, have an adverse effect on the quality of the data.

Since low-energy photons are used in all present devices, absorptivity depends on both the density and elemental composition of each substance which forms a part of the object scanned, and can be dependent as well upon the exact order in which tissues of the various types are juxtaposed along the path of the photons employed in these scans. This multiple dependency requires that physical models (phantoms) predicting and representing the distribution of bone, fat, and muscle tissue be used as test samples in order to properly calibrate the instrument used to attempt to determine the actual in vivo distribution of bone, fat, and muscle tissue in the object region scanned.

Obviously, the phantom used may not actually mesh with reality for any given patient. Indeed, a good deal of research and development is being devoted to attempts to provide sets of phantoms which might bear a much closer correspondence to in vivo reality and which might serve to better cross-calibrate these various types of scanning instruments.

The low-energy X-rays and gamma-rays currently used in these devices are polychromatic; none utilizes a source of mono-energetic photons; some of these photon rays are made up of a relatively broad and continuous distribution of energies. As polychromatic radiation penetrates an object, the lower-energy components of these rays are preferentially absorbed relative to their higher-energy components, effectively increasing the average energy of the ray-beam as it passes through the object. This effect is progressively accentuated the lower is the average energy of the initial polychromatic radiation, and is particularly severe for the average initial energies of radiation employed in present absorptiometric devices. This change in average energy or the spectral distribution of each of these polychromatic rays is known as beam-hardening. Beam-hardening results in a given thickness of a particular tissue scanned deeper within an object (further from the photon source) presenting a lower absorptivity to the beam-hardened rays than would an identical thickness of the same tissue located closer to the photon source.

All currently employed bone density scanners assume that the human body contains only two "substances", with each having its own specific absorptivity to incident radiation of a given energy. One substance is bone material having its own associated absorptivity to this incident radiation. The second substance lumps together all other material (bone marrow, muscle tissue, blood, body fluids, water, etc.) and treats them as having a single, homogeneous characteristic absorptivity (different from bone) to the same incident radiation. This latter assumption is not valid. Further, adipose (fat) is known to be yet a third substance presenting yet a third characteristic absorptivity to the same radiation which, if not present in absolutely uniform layers throughout the body region scanned, causes large inaccuracies in the scan results obtained. While complications caused by non-uniform fat deposits are known to severely affect the results obtained using the present devices, they are relegated to general correction techniques based on elaborate approximations and specific presumptions which are not necessarily accurate or appropriate for any given patient or for a random collection of patients.

Currently, "phantoms" or models of the region scanned are used in an effort to disentangle these various complications, including beam-hardening, uneven distribution of the tissues (bone, fat, and soft tissue), presence of fat globules, etc. This is an unsatisfactory approach because a useful phantom must assume more knowledge of the region studied than is actually known. Indeed, using phantoms often requires making assumptions, such as the presence of homogeneous layers of fat, foreknowledge of beam-hardening, etc. which cannot be known a priori to be correct or appropriate. Such erroneous assumptions may also have the effect of causing a large, but low-density, fat deposit, acquired since a patient was first scanned, to be misinterpreted as a slight increase in bone density since the first scan.

Figure 1:
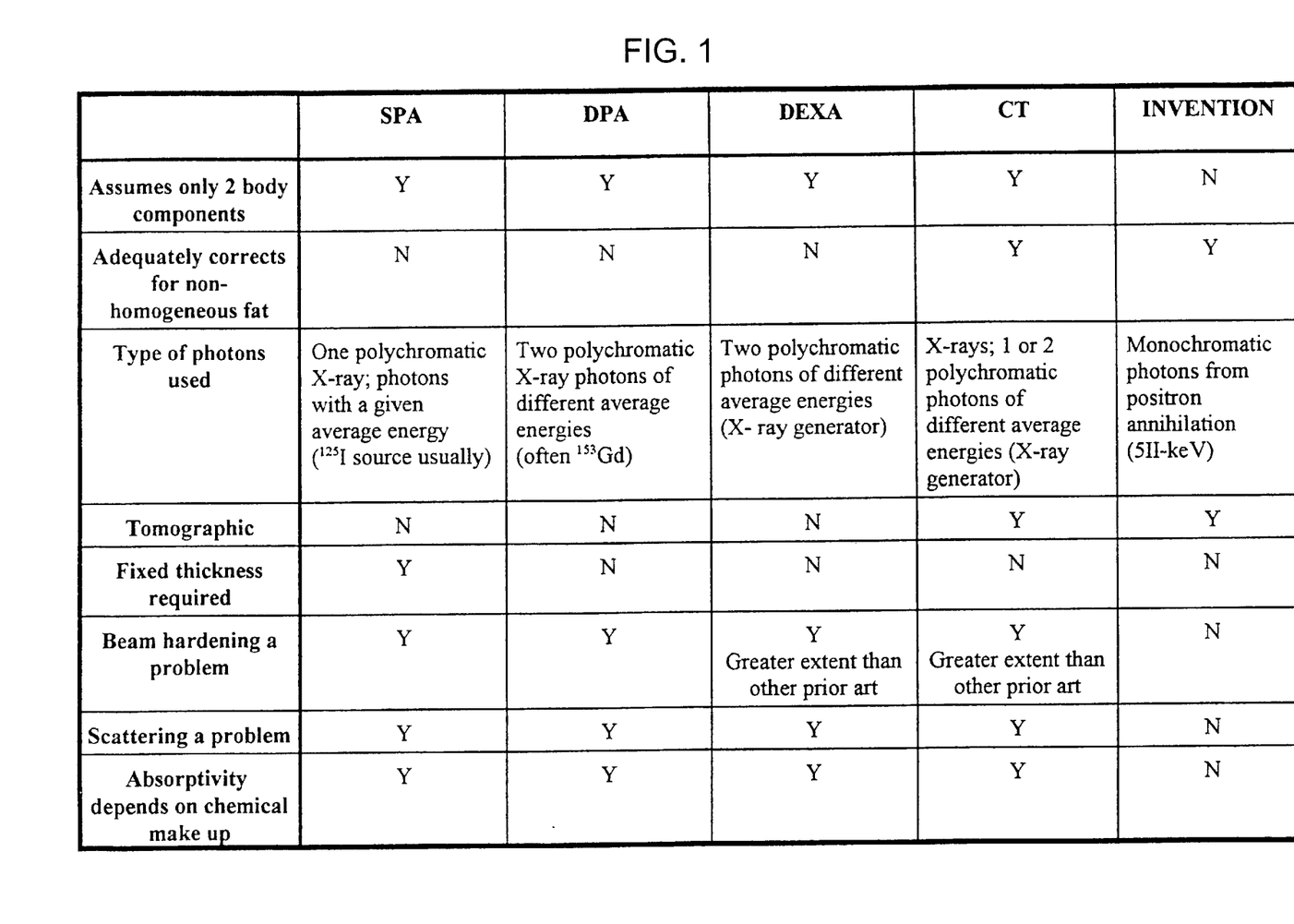
FIG. 1 is a table summarizing some advantages of the densitometer (of the present invention) over the prior art.

These techniques are described in *Methods of Bone Mineral Measurement* by P. Tothill (Phys. Med. Bio. 34, 543–572 (1989)); *Ability of Four Different Techniques of Measuring Bone Mass to Diagnose Vertebral Fractures in Postmenopausal Women*, by Susan M. Ott, R. F. Kilcoyne, and Charles H. Chesnut III (J. Bone & Min. Res. 2, 201–210 (1987)); *Methods of Determining Bone Mass*, by Susan M. Ott (J. Bone & Min. Res. 6 (Suppl. 2), S71–S76 (1991)); *Comparisons Among Methods of Measuring Bone Mass and Relationship to Severity of Vertebral Fractures in Osteoporosis*, by Susan M. Ott, R. F. Kilcoyne, and Charles H. Chesnut III (J. Clin. Endocr. & Metab. 66, 501–507 (1988)); *In Vitro Comparability of Dual Energy X-Ray Absorptiometry (DEXA) Bone Densitometers*, by M. L. Rencken, R. Murano, B. L. Drinkwater, and C. H. Chesnut III (Calcif. Tissue Int. 48, 245–248 (1991)); *Comparison of Dual-Photon Absorptiometry Systems for Total-Body and Soft Tissue Measurements: Dual-Energy X-rays Versus Gadolinium 153*, by Mary Russell-Aulet, Jack Wang, John Thornton, and Richard N. Pierson, Jr. (J. Bone & Min. Res. 6, 411–415 (1991)) among others. Additionally, in FIG. 1, the characteristics of these prior art techniques are compared with the present invention in table form in order to highlight the advantages of the present invention.

Another known technology uses positron emission for imaging, but is not suitable for determining bone density or the like. This technology is positron-emission tomography (PET). PET uses a short half-life, radioactively-labelled substance introduced to the subject internally for the purposes of the scan. This radioactive substance emits positrons, which, after annihilation with electrons, give rise to positron annihilation radiation. Usually, PET is used to measure and identify the locations (sites) of that radioactively labelled substance within a subject patient and/or the biological activity of the radioactively labelled substance at such sites. The location of the substance is determined by measuring the characteristic simultaneous, oppositely-directed emission of pairs of photons from positron annihilation in and around the substance using a tomographic system of radiation detectors.

SUMMARY OF THE INVENTION

The present densitometer invention produces a quantitative tomographic image of the distribution and variation of the density within a cross-sectional "slice" (segment) through an object scanned, such as a portion of a bone in the body, a prosthetic device implanted in a bone, or bone material adjacent to an implanted prosthetic device, using a relatively safe external source of radioactivity. Such a tomographic image of a single cross-sectional slice is normally presented as a two-dimensional plan-view of that slice. By natural extension of the technique, planar views of selected facets of the object, as well as a 3-D image of the object, or a portion thereof, can be obtained, all of which are densitometric. Similarly, in another application the present densitometer invention can be adapted to determine the density variations and distributions of objects among the contents of a sealed parcel, such as airline, bus or train luggage, even parcels containing a bomb made of gelignite, or a parcel containing some other object. Additionally, objects such as utility poles and pipes can be assessed for density distribution and variation in order, for example, to locate rot or other hidden problems which may be discerned in terms of density distribution. The object scanned need not be solid, but may be hollow or partially hollow, with the hollow filled in part or wholly with another foreign substance which has a density different from that of the object.

This densitometer takes advantage of the characteristic properties of the mutual annihilation of a positron (an anti-electron) and an electron. If the particles annihilate at rest, they disappear and the energy equivalent (1022-keV) to their combined masses takes the form of two exactly oppositely directed (180 degrees apart) photons of the same energy (511-keV) emitted from that site. These photons are known as annihilation radiation. If the positron is still moving when it is annihilated, the photons are not emitted in exactly opposite directions, but the departure from 180 degrees is minor, except for very rapidly moving positrons, and, therefore, a pair of annihilation photons emitted at a relative angle to each other which departs from 180 degrees to such a minor extent will be considered "oppositely directed" for purposes of this invention. This departure from exactly opposite emission directions is completely negligible for the positron energies associated with those positron-emitting radioactive sources suitable for use in the present invention.

Another property of annihilation radiation (511-keV) exploited in the present invention is characteristic of all photons whose energies are between about 350-keV and about 1500-keV. All elements with atomic numbers between that of carbon and copper possess virtually the same absorptivity to a photon of specific energy within this range. The absorptivity depends only on the number of atoms of any such particular element along the path of that photon. For photon energies between 500-keV and 1500-keV, this special property is extended beyond copper to tin. Any minor disparity among their absorptivities is wholly negligible from an instrumental perspective. The absorptivity to 511-keV photons of substances composed of these elements depends only upon the density and thickness of any such substances in the path of the photon. The only prominent elemental constituent of the animal body not within the atomic number range of carbon to tin is hydrogen. Its effect upon the absorptivity of tissue to 511-keV radiation is slight. While all tissue types (bone marrow, muscle tissue, blood, body fluids, water, etc.) and adipose (fat) still present matching absorptivity (measured in centimeters squared per gram, $cm^2/gm$) to annihilation radiation, that absorptivity (in $cm^2/gm$) is marginally different from that of bone. This means that most soft tissue types, including water, have essentially the same percent of hydrogen by mass, while bone has a slightly different percent, with the concomitant result that the ratio of the absorptivity (in $cm^2/gm$) of bone to that of all other tissue constituents present (fat, muscle, red marrow, blood, water) is virtually constant for photons in the energy range between about 200-keV and 1500-keV. This characteristic of the absorptivity for 511-keV photons has the consequence that positron annihilation radiation absorptivity measurements made on animals using the present invention depend directly only upon the density (not the composition) of material along a fixed length of traverse of these photons, and makes the present invention a true densitometer when used in a tomographic mode. As all present SPA, DPA, DEXA, PQCT, QCT, and CT instruments rely upon the absorptivity of low-energy X-rays or gamma-rays, and as this absorptivity depends on both the composition and density of the material scanned, these prior art instruments cannot be considered densitometers in the true sense.

A third property of annihilation radiation (511-kev) exploited to great advantage in the present invention is the absence of effects of beam-hardening, as the annihilation radiation is a photon having a single, discrete energy and is not, as in the case of existing devices, polychromatic radiation.

The present densitometer also exploits the exactly opposite direction of emission of a pair of annihilation radiation photons by positioning an object of unknown density distribution between the positron source and a first ("blocked") detector of a pair of detectors. The second ("unblocked") detector of that pair is diametrically opposed to the first detector and on the far side of the positron source, opposite to that of the object scanned. The two detectors and the annihilation photon source are all aligned along a single straight line which passes through the object under study.

The fraction of those photons emitted from the positron source towards the blocked detector which survive without interaction in the object is the fraction detected by the blocked detector. This fraction depends only on the density and thickness of material in the object along the original path of the "blocked" photon. The logarithm of this fraction is directly proportional to the product of the density and thickness of material is along that path. The detectors, while aligned with the photon source, can be moved about the object so that the density of each small part of the object (represented by a pixel of fixed dimension in a tomographic image of the object) can be calculated, and a computerized tomographic "back-projected" image of the object generated. Of course, many pairs of oppositely positioned detectors, together with one or more positron sources, may be used simultaneously, the object in question being "illuminated" fully in a fan-beam geometry by the annihilation radiation source(s) throughout the scan. (See FIG. 4.)

In accordance with the invention, pairs of photons resulting from a mutual positron-electron annihilation in a well-defined location (either at the site of a point source, or of a line source oriented perpendicularly to the plane of motion of the detector), are used. A pair of photons is emitted back-to-back at this source site. One photon is emitted along a line passing through the object towards the first detector, while the other passes unimpeded to the second detector. The individually detected events ("singles") in each detector are registered and stored separately. If these events are detected by the paired detectors simultaneously (in time coincidence with each other or "coincidences") they are also registered as a coincidence event associated with that specific detector pair.

The rate of detection of singles in the unblocked detector is the number of 511-keV photons per unit time emitted along the line joining the unblocked detector and the positron source. Of course, due to annihilation radiation always generating two photons, that rate is identical to the number of 511-keV photons emitted from the source towards the blocked detector of that pair per unit time. Thus, the number of coincidence events detected between the unblocked and the blocked detectors of a given detector pair is also the number of 511-keV photons emitted directly towards the blocked detector of that detector pair which did not interact with the intervening object.

Thus, the ratio of the number of coincidences to the number of singles recorded in the unblocked detector represents the fraction, F, of 511-keV photons which did not interact within the object under investigation. Subtracting that fraction from unity (1−F) represents the fraction of 511-keV photons that interacted within the object along the line connecting a given pair of oppositely positioned detectors and the source itself. When many pairs of oppositely positioned detector pairs are used, the fraction, F, associated with each given detector pair is registered and stored separately.

The tomographic scan is completed when a sufficient number of such radiation detections have been made along a series of straight lines (each such line defined by a detector pair and the positron source) effectively rotated about the object. The family of F values can then be back-projected using dedicated computer software specific to the geometry and arrangement of the instrument to yield the desired tomographic image of the object under study. A review of the mathematical basis of computer-assisted tomography is described in Chapter 12, "The Mathematics of Image Formation and Image Processing", by S. Webb in "The Physics of Medical Imaging", ed. W. Webb (IOP Publishing Ltd., Adam Hilger, Philadelphia), 1988, pp. 534–566. Each such tomographic image is a picture of a slice of the object in the plane of the scan, made up of square "pixels" (picture elements) of identical size. As each such image is composed of pixels of identical dimensions, and as the absorptivity of the material contained within each pixel depends only on the density of that material and the known length of the pixel (the length being identical in both directions as the pixel is square), the measured absorptivity of each separate pixel of the image is a direct measure of the true density (grams per cubic centimeter, $gm/cm^3$) of the material contained within that tomographic pixel element. Thus, computerized tomography used with the present densitometer allows direct visualization of the distribution of density ($gm/cm^3$) throughout the object. The use of positron annihilation radiation, because of its properties described above, eliminates the need to scan "phantoms" (physical models of the object studied to calibrate the system). The tomographic image is represented by pixels of identical size, each of which presents the true density of the material therein pictured.

Because the pixels of any given region can be isolated for study, additional calculations can provide information such as mass (gm), mass per unit length (gm/cm), areal density ($gm/cm^2$), cross-sectional area ($cm^2$), and any linear dimension (cm) for any region of interest.

The instrument can be used to create a picture of a projection of the object in the plane of the scan. The instrument can then calculate the mass (gm) and the mass per unit length (gm/cm) of any region of interest in this projection, as does SPA, and the mass per unit area ($gm/cm^2$) of the region of interest, as do DPA and DEXA, providing information similar to, and at least as useful as, that of these prior arts.

A number of radioactive nuclei emit positrons which give rise to annihilation radiation photons as they decay, but the decay of $^{22}Na$ to $^{22}Ne$ emits positrons of very low energy (one of the lowest energies of emission of positrons among the various radioactive positron-emitting sources feasible to use in this device). Because these positrons are of low energy, they come to rest quickly within the source material itself or the material (plastic or thin stainless steel) housing the radioactive source at a site less than a half a millimeter from the point of their emission. Thus, the great advantages of utilizing the low-energy positrons from a $^{22}Na$ source are (1) that virtually all positrons are at rest when the annihilation process takes place, resulting in virtually all of the annihilation radiation photon pairs being emitted in exactly opposite directions and (2) the origin of the photon pairs is localized to the small (usually a millimeter in diameter) source container.

These characteristics define precisely the straight line path connecting the detector pairs and the source, resulting in improvement of the attainable spatial resolution of the tomographic image.

As the operation of the system rejects any and all coincidence detection pairs which do not themselves define a straight line through the known location of the $^{22}Na$ source, the above two advantages of the use of $^{22}Na$ allows further rejection of all coincidence events which arise due to scattering of the 511-keV photon in the object under study. Recording of coincidence events arising from scattering of radiation from one detector in an array of detectors to another is effectively eliminated. This anti-scattering feature eliminates the need to use detector collimators or shields. This is a major advance, as the present device obviates blurring and other artifacts which degrade the quality of the tomographic image and the information which can be gleaned from it. All existing densitometer devices (SPA, DPA, DEXA, pQCT, QCT, CT) are affected adversely by such photon scattering. As for PET (positron emission tomography), the site of the source of the annihilation radiation is not known. Indeed, the determination of the site of the source of the annihilation radiation is the objective of the measurement. Thus, scattering of radiation within the object studied, or scattering from one detector to another, remains a major problem in PET studies, even with the use of numerous collimators and shields.

Another advantage of $^{22}$Na is its relatively long radioactive half-life of 2.6 years, four times longer than the 242-day half-life of the $^{153}$Gd radioactive source used in DPA, and almost 16 times longer than the half-life of the $^{125}$I radioactive source used in SPA. This long half-life results in the decreased frequency of replacement of the source material when using $^{22}$Na than is true for SPA and DPA sources. $^{22}$Na can be replaced every 5–6 years, while $^{153}$Gd should be replaced annually and $^{125}$I should be replaced about 3 times a year. Thus, using $^{22}$Na as a source of photons results in less frequent servicing and lower exposure to radioactive sources by service personnel.

One additional advantage of the present system is that the mode of operation fully and automatically takes account of the decay (diminishing strength) of the $^{22}$Na source, while correction for the decay of sources used in SPA and DPA is not automatically taken into account and presents a problem when those instruments are used. Even DEXA, pQCT, QCT, and CT, are beset with source strength fluctuations (variations in the intensity of the X-rays generated within these instruments).

BRIEF DESCRIPTION OF THE DRAWINGS

The features of this invention which are believed to be novel are set forth with particularity in the appended claims. The invention, together with its objects and advantages, may be best understood by reference to the following description, taken in conjunction with the following drawings, in which like reference numbers identify like elements in the several figures and in which:

DESCRIPTION OF THE PREFERRED EMBODIMENT

Figure 2:
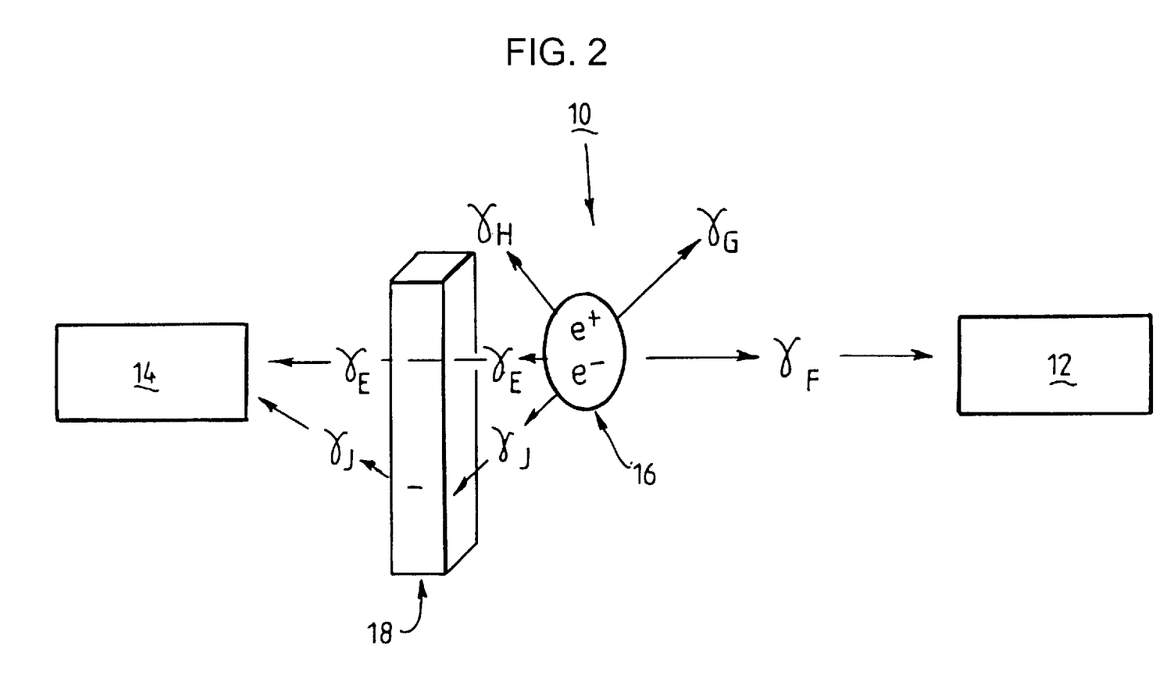
FIG. 2 is a diagrammatic representation of the densitometer in its simplest form.

Turning to FIG. 2, a densitometer 10 in accordance with the present invention is described diagrammatically.

Two detectors, 12 and 14, are aligned with the annihilation radiation photon source 16 therebetween. The photons will be detected by scintillation detectors, preferably CsI(Tl) (thallium activated cesium iodide), but CdWO$_4$ (cadmium tungstate) scintillators, and BGO (bismuth germanium oxide) scintillators are also suitable. These will be coupled to so-called PIN diodes (silicon light sensitive diodes). The photons interact in the body of the scintillators and the energy deposited in these is converted to light within a relatively narrow wavelength band. This light, whose intensity is proportional to the energy deposited in the scintillation detector, is converted in the PIN diodes to an electrical signal, which, after proper amplification and conventional electronic processing (using fully transistorized circuitry), indicates a photon was detected in the detector (scintillator).

The CsI(Tl) scintillators are presently preferred to, say, NaI(Tl) (thallium activated sodium iodide) because the light emitted is in the wavelength range which matches better the upper range of the PIN diode sensitivity, giving a larger and more usable signal out of the PIN diode. NaI(Tl) has a light output in the wavelength range for which the PIN diode has a smaller so-called "quantum efficiency", and has, therefore, a much smaller and, thus, less usable signal.

The shortfall in efficiency of NaI(Tl) coupled to PIN diodes can be overcome using instead photo-multiplier tubes coupled to the NaI(Tl) detectors. These, however, are far more costly than the PIN diodes, require high-voltage supplies to run the photo-multiplier tubes, require more costly signal processing, and, because the detector arrays will be moved during the scans, the photo-multiplier tubes need to be equipped with magnetic shielding, as their output signals are quite sensitive to the earth's magnetic field (both to the strength of the earth's magnetic field and to the relative orientation in space of the photo-multiplier tubes and the direction of the earth's magnetic field). There are also other practical limitations associated with the use of photo-multiplier tubes. The next generation of photon detectors will probably be CdTe (cadmium telluride), solid state detectors of great promise, and will also be suitable in the invention.

The size of each detector (scintillator) preferably may be either 3 or 5 centimeters thick (along the direction of the initial path of the photon) and be 2 cm×1 cm or 1 cm×1 cm in the plane perpendicular to that path.

If neither positron annihilation photons A nor B are absorbed by anything, they arrive at detectors 12 and 14 simultaneously. A requirement of the invention is that detector 14 will only record events which occur simultaneously with events detected in detector 12. This prevents recording three types of uninformative and obfuscating events, as described below:

(1) photons which were "scattered" (changed direction of flight and energy) by interacting within the object 18 or other extraneous material present nearby so that they impinge on detector 14, but were initially directed elsewhere, (2) events involving true gamma-rays which, although uncorrelated in direction with the annihilation photons, are emitted as part of the nuclear radioactive decay from many positron-emitting sources which may be used in this device, including $^{22}$Na from which a gamma-ray of 1275-keV is emitted along with 511-keV annihilation photons, and for which the object constituents may possess an absorptivity very different from 511-keV radiation, the detection of which could blur and distort the resulting tomographic image, and (3) chance or otherwise not associated events that would contaminate the recorded data.

Photons G and H arise from the accidental, simultaneous decays of two radioactive nuclei in the source. They will not be detected because they are not emitted in opposite directions. The coincidence requirement (both in time coincidence and in the geometric constraint that is required for coincidence event registration) obviates registration of their detection.

The signal derived from each detector, when it registers a photon absorbed in it (detects a photon), is used to generate an electronic "timing" signal of fixed width in time and of a given, fixed amplitude. These "timing" signals are positive in polarity, but negative polarity signals can be used as effectively. If one wants to register "simultaneous" events detected in two detectors (call them Detector A and Detector B), the "timing" signal from each of the pair of detectors is made to appear at separate "inputs" of a coincidence circuit. In this case, the coincidence circuit can be a simple "AND" device, but other forms of coincidence circuits can also be used. This AND device produces an "output" signal only when two "inputs" receive a timing signal at the same time (simultaneously). And, only if an output signal from the coincidence circuit is manifest, will an associated event registered in a "blocked" detector be recorded in the appropriate memory location of the computer assigned to that "blocked" detector. As the width of each timing signal is of fixed time duration, T, the AND circuit will produce an output signal only if the timing signal from Detector B arrives at the AND circuit input within a time T after the arrival at the AND input of the timing signal from Detector A. However, it is also possible that the timing signal from Detector B arrives at the input to the AND circuit first. Then, the AND circuit will only produce an output signal if the timing signal from Detector B arrived at the input of the AND circuit no earlier than a time T prior to the arrival of the timing signal from Detector A. A valid coincidence occurs if an output signal is received from the AND circuit, which will occur if the timing signals from Detectors A and B arrive at the inputs of the AND circuit within the fixed time duration, T, of each other. This system has a "resolving time" of two times the fixed time duration, or 2T. If any two events arrive at the inputs of the AND circuit within this "resolving time", the events in Detectors A and B are termed "simultaneous". Such a coincidence circuit is readily available in "chip" (integrated circuit) form (for example, an HCT08 quadruple 2-input AND chip).

As coincidences will be recorded between any two detectors in many pairs of detectors in opposite arrays, the AND coincidence scheme is a straight-forward extension of the simpler two-detector version. As a given "coincidence" involving a given detector pair is associated by logic circuitry, the number of such coincidence events for each given detector pair is stored in a separate memory location in the computer. The resolving time may be as short as 0.2 microseconds, but longer or shorter resolving times may be suitable.

If, for whatever reason, an event is detected in a "blocked" detector of a detector-pair which does not overlap within the stated resolving time with an event in the "unblocked" detector of that pair, registration of that event in the "blocked" detector is rejected.

Two detectors may register an event which is within the resolving time constraint and, thus, be considered in "coincidence" and "simultaneous" with each other, even if the two detectors do not constitute an oppositely positioned detector-pair. As an example, this can occur when an annihilation event takes place and two oppositely directed 511-keV photons are emitted from the source. These may be initially directed at opposite detectors of a detector-pair. However, the photon which must pass through the object 18 to the "blocked" detector of the pair could undergo scattering in the object 18 and change its direction such that it strikes a "blocked" detector not a member of this specific detector-pair towards which the photons were initially directed. A conventional digital logic system is set up to reject this event, even though it was in time coincidence with the "unblocked" detector towards which it was initially emitted. While this event was in time coincidence, it did not meet the geometrical constraint criterion which rejects events if they do not take place simultaneously in any given diametrically oppositely positioned pair of detectors. That is, because the photons were not detected in geometrically opposite detectors, the system knows that they were not the result of a pair of positron-electron annihilation photons which were unimpeded by any matter intervening in their initial path.

It is possible for two diametrically oppositely positioned detectors to detect photons and satisfy the geometrical constraint, but not be simultaneous with each other (i.e., not satisfy the time coincidence constraint). This can come about, say, from two separate radioactive decays in the source (from two separate radioactive nuclei). While it is the case that each of these decays gives rise to a separate set of oppositely directed photons, the two decays, nevertheless, did not occur simultaneously. And, suppose none of these four 511-keV photons were initially directed towards any detector. One photon of one pair could scatter from some extraneous material, change its direction, and then enter and be registered in a given detector, its photon mate going off into space not registering in any detector. Then, one of the photons from the second decay might also scatter from some extraneous material and change its direction so as to register in the mate of the other detector that also registered an event due to scattering, its associated annihilation photon likewise going off into space and not registering in any detector. Thus, we find two photon registrations, one in each detector of a given oppositely positioned detector-pair, which satisfies the geometrical constraint. Yet, although this geometrical constraint is satisfied, the event is rejected, because the two registrations were not in time coincidence with each other.

For two detectors to be considered members of a diametrically oppositely positioned detector-pair, the mid-lines of those detectors must form a straight line that passes through the radioactive source. Because the radioactive source is at the center of the circle on whose circumference are located diametrically oppositely positioned arrays of detectors, the specific members of any given detector-pair are known. The responses of all detectors are encoded logically and the system always knows which two detectors to associate with a given detector-pair.

Instead of generating photons G and H, suppose photons G and J are generated from a positron annihilation event in the source. Neither G nor J is initially directed toward detectors 12 and 14. However, annihilation photon J could be "scattered" by interacting with object 18, resulting in a change of direction, and then detected by detector 14. Because detector 14 is restricted to record only those events which occur simultaneously with events detected in detector 12, and no objects intervene to scatter photon G toward detector 12, the detection by detector 14 of the scattered photon J will not be recorded. Distortion of the tomographic image eventually generated is thus reduced.

In order to understand how the densitometer determines the density distribution of the object scanned, one need consider only the photons generated by annihilation of positrons and electrons at near rest (that is, those 511-keV photons emitted in directly opposite directions) and, indeed, only those which could be detected by detectors 12 and 14 within the time coincidence and geometrical constraints determined by sizes, distances from the source 16, and the straight line path through the points of their detection (detectors 12 and 14) and the small, effectively point-like source 16. Generally, for positron energies emitted from radiation sources useful in this invention, even positrons annihilated in motion will cause the annihilation photons to depart only negligibly from back-to-back emissions.

An equal number of annihilation photons (511-keV) are initially emitted simultaneously and in opposite directions from the radioactive source 16. For instance, photons E and F are emitted, one headed initially towards "unblocked" detector 12, the other towards "blocked" detector 14. If A designates the number of photons F which reach detector 12 not absorbed or impeded, then the number of photons E which are initially emitted from the source directed toward detector 14 is also A. However, the object under study intervenes and a number of E photons are absorbed or scattered by object 18 and, as a consequence, do not reach detector 14. Other E photons are neither absorbed nor scattered and do reach detector 14. B designates the number of E photons that reach detector 14 without absorption or scattering in the object 18. The fraction of those photons headed initially toward detector 14 and which actually reach it is B/A. However, detector 14 only records B. Fortunately, the system 10 is designed so that detector 12 has recorded the number A of photons E that reach it, as well as allowing for the registration of the B coincidence events which reach both detectors 12 and 14 simultaneously. Thus, both the numbers A and B are recorded and registered, and the fraction B/A of photons which are not absorbed (or scattered) by object 18 is calculated. If all annihilation radiation photons headed initially toward detector 14 were absorbed or scattered by object 18, then B=0 and B/A=0. If no such photons were absorbed or scattered by object 18 (e.g., the object was absent), then B/A=1. Thus, the ratio B/A can vary from 0 to 1.

The exact value of B/A depends solely on the density and thickness of the object 18 along the path defined by the direction of the photon initially headed toward detector 14 (identical to the line defined by coincident detection of photons in detectors 12 and 14 and the source 16 location).

Many such paths through the object 18 are defined by the array of detector pairs and the known source position 16 as the detector arrays and source 16 are moved about the object 18, with the ratio B/A determined for each such path through the object 18. A table of B/A values can be compiled from these determinations.

$B/A = e^{-\lambda \rho x}$, where $\lambda$ is the absorptivity (in $cm^2/gm$), $\rho$ the density (in $gm/cm^3$), and x the length (in cm) of the material of object 18 along the path of the original direction of the photon. The natural logarithm of B/A is the product $(-\lambda \rho x)$ along that path. That is, $\ln(B/A) = -\lambda \rho x$. The natural logarithm of each such ratio will, by the process of "back-projection" using computer software, form a square array of "pixels" of fixed size, with the "contents" of each such pixel representing the logarithm of the ratio B/A, $(-\lambda \rho x)$, for that square element of the tomographic image of object 18.

As in tomographic imaging, the common size of each pixel (x) is known, via once-only calibration of the system, the value of the absorptivity times the density $(\lambda \rho)$ of the material of object 18 represented within any given pixel may be determined. And, as the absorptivity, $\lambda$, of the material represented by a given pixel of the object 18 is effectively the same (property of absorption of annihilation radiation photons), the density, $\rho$, of the material represented by a given pixel may be calculated from $$\rho = \frac{\ln(B/A)}{-\lambda x}.$$

The common size of a pixel is defined by the sizes of the detectors, the distances of the detectors from the source, the distance of the center of the object from the source, the number of detectors in each array, what angles the detectors (or half-detectors in the case of staggered detectors) intercept at the source, etc. In one experimental prototype device, pixels will be approximately 1 millimeter in length by 1 millimeter in width. This could be reduced by having smaller detectors, a larger overall circle on which the detectors were situated, etc. Thus, the spatial resolution in the prototype device, which is related closely to the size of the pixel, will be approximately 1 millimeter at the center of the object 18.

Some fraction of the photons initially headed for detector 14 are scattered, but not necessarily absorbed, in the object 18, much as the photon J was scattered as described above. The possibility of such scattering of 511-kev photons is intrinsic to the total absorptivity of the object material for these photons and is thus directly related to the density of the material in a given pixel as true absorption in that material would be. True absorption occurs when the photon is absorbed by the material, while scattering occurs when some fraction of the photon's energy is lost to an electron and the photon continues as a lower energy photon in a direction different from its initial path ("Compton scattering"). Thus, the total absorptivity (in $cm^2/gm$) of object 18 is the same for all elements of atomic mass between carbon and tin (most elements of biological interest, carbon, phosphorus, nitrogen, oxygen, calcium, sulfur, potassium, sodium, etc. fall in this domain). The absorptivity for photons of energy between about 350-kev and about 1500-kev has this property and is measured by the ratio (A-B)/A. Annihilation photons are of energy 511-kev and fall within this range comfortably. Counting both A and B and calculating B/A also prevents the decay of the radioactive source from affecting density calculations. Recording both A and B provides a valuable self-normalizing feature for the present densitometer system.

The X-rays and gamma rays currently used in bone densitometry are of lower energy than these photons. Thus, for currently used densitometers, absorptivity depends in a complicated way on both the density, thickness, and the elemental composition of the object. The decay of the radioactive source also affects density calculation in SPA and DPA densitometers.

Obviously, just knowing the density of one small part or pixel of object 18 may not be sufficiently informative. So the source and the aligned detectors may be moved as a unit around the object, which is held fixed, generating absorptivity numbers continuously, providing the requisite data with which to form a tomographic image of the entire object. Alternatively, the object may be rotated, while the source and aligned detectors are held fixed.

Figure 3:
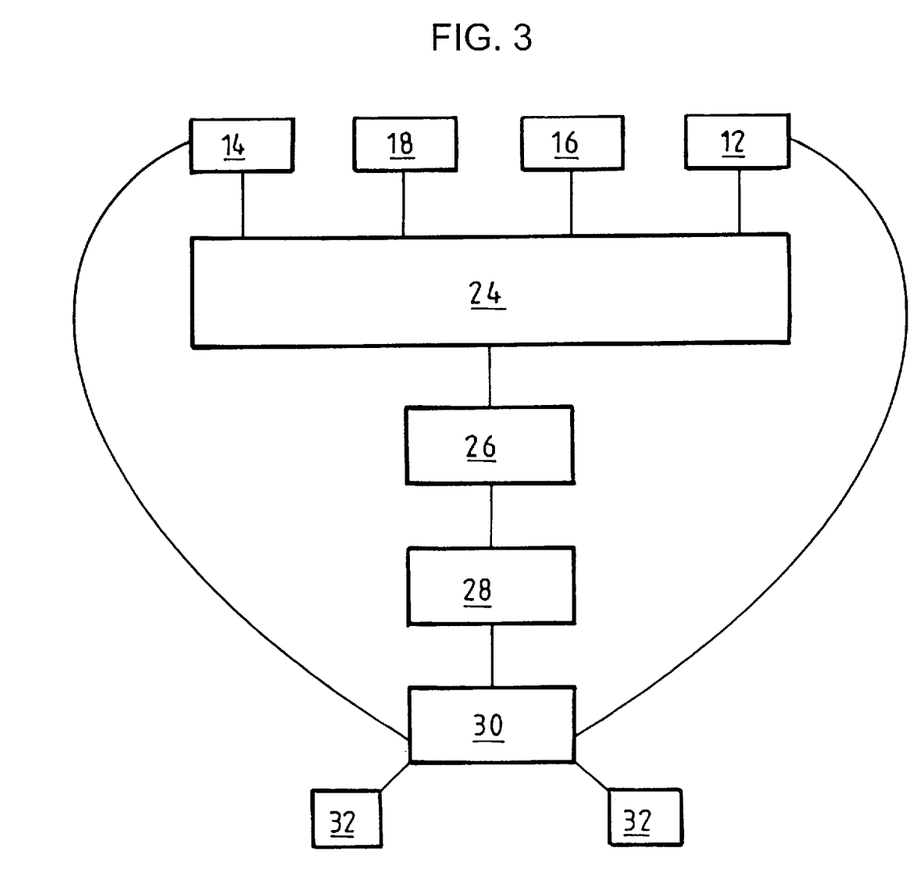
FIG. 3 is a schematic representation of an embodiment of the invention.

FIG. 3 illustrates in schematic form a preferred embodiment. The detectors 14 and 12 will be moved by a gantry 24. The gantry 24 is preferably an aluminum ring (although other materials are suitable) on which the detectors 14 and 12 and the source 16 are mounted and positioned in place relative to the object 18 to be scanned. The gantry 24 is rotated about a pivot point 22 by being coupled to, say, timing belts 26 which are moved in discrete steps by incremental stepping motors 28. The movement may be controlled by computer software 30 which also keeps track of and stores the location and orientation of all detectors at all times. Knowing the location and orientation of all the detectors when photons are detected in the detectors enables the detected events to be stored by the computer 30 in a location-specific manner. The digitally-encoded detector event signals are then routed to appropriate scalers 32 (counters) in the computer interface to be interpreted using decoding logic. A scaler may be characterized as an electronic chip (integrated circuit) that is able to be incremented, decremented, and to store numbers 0 and, say, $2^{16}$ (65,536), or 2 raised to a higher power (a number even much greater than 65,536). The scaler may be reset to register zero by an external logic pulse, incremented or decremented by an external logic pulse, and have its contents (the number stored at any given time) read by a computer at any time.

Using all this data will allow the density of material "imaged" in each of the pixels of the tomographic image of the entire object 18 to be determined. The invention thus discriminates between low density deposits of fat and high density bone material, separates muscle tissue from bone material, discriminates between cortical and trabecular bone regions and can present separate and extracted tomographic views of each, among other things. The discrimination between cortical (compact bone surrounding the trabecular bone) and trabecular bone (the meshwork of cancellous bone in which the interconnecting spaces are filled with marrow) is possible because the densities of the two regions of interest differ, as do the densities of fat, muscle, and bone material which allow their tomographic separation and distinction.

Figure 4:
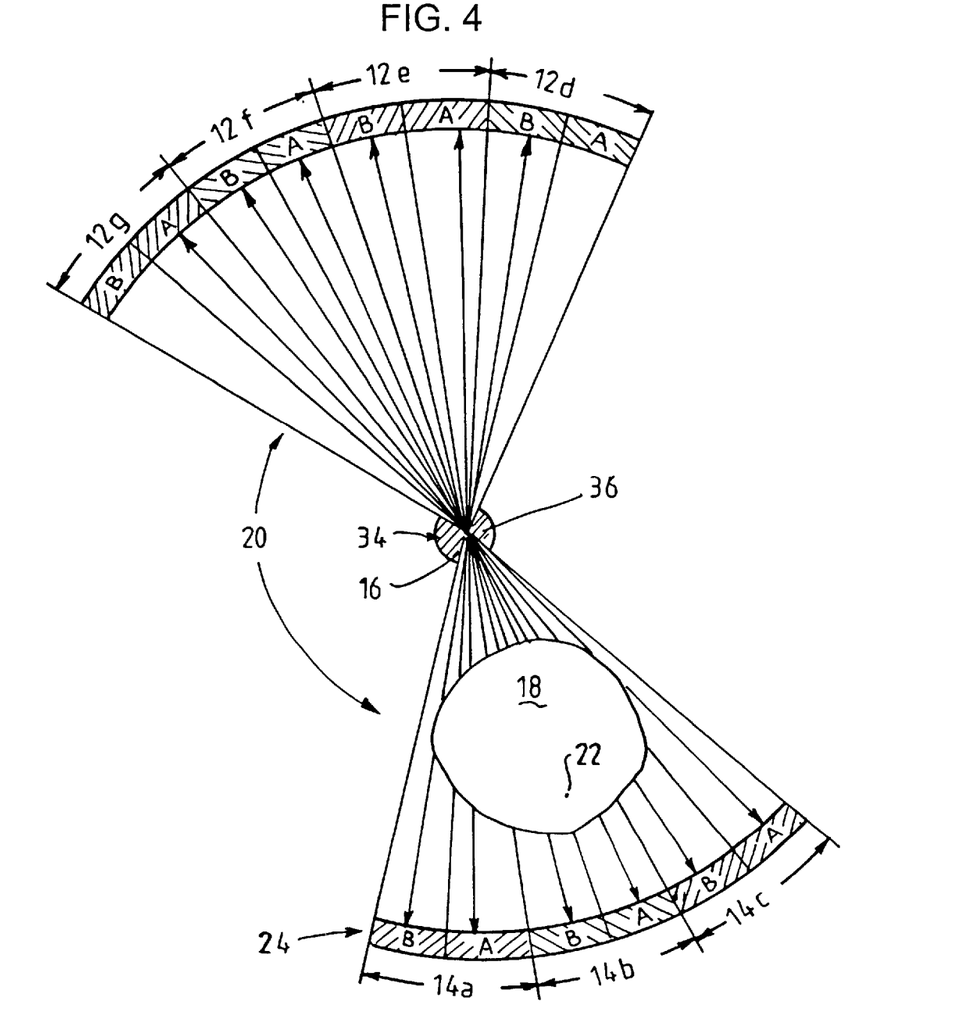
FIG. 4 is a schematic representation of a densitometer using multiple sources of photons and detector arrays.

The speed of the scan can be increased by using several pairs of detectors arranged in two opposing arrays forming arcs of the same circular ring, with each oppositely situated pair aligned radially so that each such detector-pair defines a straight line through the source as seen in FIG. 4. Each "blocked" detector will still register only events in coincidence with its "unblocked" mate, as in the single detector pair described in detail.

FIG. 4 illustrates several pairs of detectors 14$a,b,c$ and 12$d,e,f,g$ held fixed relative to the radioactive source 16 on a gantry 24. The radioactive source 16 may be shielded by a collimator 34. These detectors and source rotate progressively about an axis 22 through some point through the object 18.

The pairs of diametrically oppositely positioned detectors in the opposing arrays of detectors are preferably aligned in a staggered manner by one-half the length of a detector, as shown in FIG. 4. That is, the mid-line of one detector of a "pair" is diametrically opposite the edge, not the mid-line, of its opposite number. The staggered alignment results in a higher spatial resolution than does "unstaggered" alignment using the detectors of the same physical size. For instance, for such staggered detector arrays, if a coincidence event occurred between detector 12$g$ and detector 14$c$, then the event is recognized as having occurred in part A of each of those detectors, because the points of photon detection must define a straight line which passes through the source 16 when positron annihilation radiation is used, as we do. Similarly, if a coincidence event occurred between 14$c$ and 12$f$, then the event occurred in part B of each of those detectors.

If the detectors were not staggered, an event position in a given detector could only be localized within the full length of that detector. Using staggered detectors reduces the uncertainty of the geometrical location of a coincidence event by one-half.

This staggered design causes the effective number of photon detectors to be twice that of the actual detector number, with the effective width of each such effective detector half that of each actual detector. In comparison with an unstaggered arrangement, this staggered arrangement doubles the number of effective detectors, halves the length and width of each square pixel, thus effectively quadrupling the number of pixels (picture elements) which define the tomographic image.

In a preferred embodiment of this invention, the following provision will be incorporated into its design and operation. That provision allows for (i) first rotating both complete detector arrays of a given system (as shown, say, in FIG. 4) as a rigid unit around an axis 36 passing through the source position 16 by an angle equal to one-quarter of that intercepted at the source position 16 by any given actual equal-sized detector in the system without altering the position of the source 16 itself in any way, (ii) next locking the detector arrays and the source 16 as a rigid unit again, and then (iii) proceeding to make another full scan, as described earlier, with this arrangement. This second scan produced by following this prescription has the effect of doubling, yet again, the number of effective, independent detectors used in the overall tomographic scan. A full scan employing this "one-quarter detector angle shift" arrangement, when combined with a full scan made with the staggered-detector arrangement described earlier, yet again halves the dimension of each of the equal-sized pixels, thus, yet again quadrupling the number of pixels which constitute the tomographic image. Thus, by utilizing the "staggered-detector" mode of operation together with the "one-quarter detector angle shift" mode operation, the number of effective pixels which would constitute a given tomographic image will be 16 times the number of pixels that would cover the same tomographic view had the same detectors and the same number of detectors in the diametrically opposed arrays not been "staggered" and not been operated in the "one-quarter detector angle shift" arrangements. The "normal" staggered-detector mode of scanning, described earlier and depicted in FIG. 4, and the "one-quarter detector angle" mode of scanning, described immediately above, can be carried out sequentially, or these two modes of operation can be interleaved during the scanning procedure. This choice can be controlled by computer software options incorporated into the overall system software design.

A dual fan beam 20 of positron annihilation radiation is generated by source 16. As in PET hardware, oppositely-placed members of a detector pair will register photons detected in coincidence with each other. Preferably, the fan beam, as in CT scanners, is formed by placing the source in a collimator 34, preferably made of lead or tungsten, with appropriately positioned openings to allow the radiation to emerge in the desired back-to-back fan-beam geometry, while radiation oriented incorrectly is absorbed by the collimator.

Figure 5:
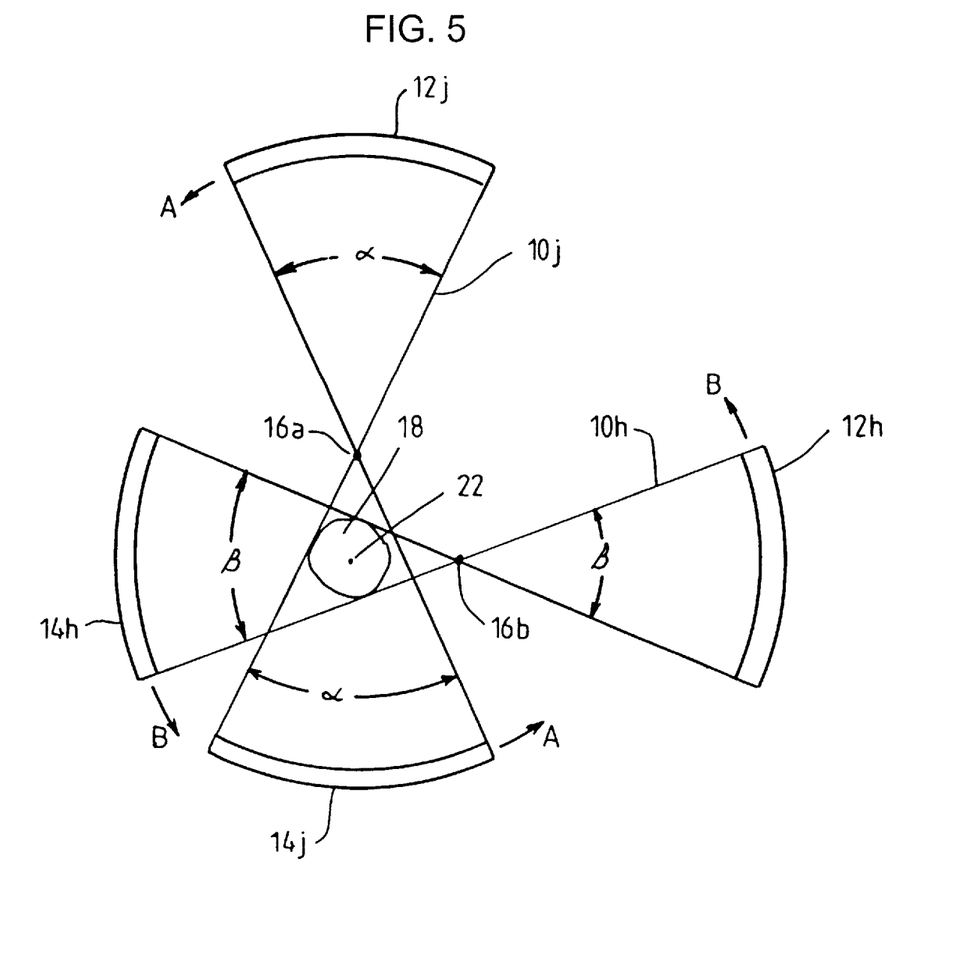
FIG. 5 is a diagrammatic representation of an alternative embodiment of the invention.

As seen in FIG. 5, multiple radioactive sources may also be used to increase the speed of the scan, if each such source is aligned between its own set of opposing detector-pair arrays, with the object 18 still intervening between that given source and its associated "blocked" detector array. In FIG. 5, source 16$b$ is aligned with its blocked detector array 14$h$ and its unblocked detector array 12$h$, comprising a system 10$h$. Similarly, another source 16$a$ is aligned with blocked array 14$j$ and unblocked array 12$j$, constituting a system 10$j$. Systems 10$h$ and 10$j$ may each be rotated separately or in tandem about the common axis of rotation 22 in the same or opposite directions. Also seen in FIG. 5 are fan beams of photons of angles $\alpha$ and $\beta$, respectively, (where $\alpha$ may or may not equal $\beta$) being intercepted by the detector arrays of system 10$j$ and 10$h$. Although shown in FIG. 5 in a preferred embodiment of the invention, the two sources 16$a$ and 16$b$ are the same distance from the common axis of rotation 22, they need not be.

Because the annihilation photons are monochromatic, they are not subject to "beam hardening", or changes in their average energy as they pass through the object under study, as are X-rays and polychromatic groups of gamma rays (used for SPA, DPA, DEXA, pQCT, QCT, and CT).

The positron ($e^+$) and the electron ($e^-$) annihilate while at rest in the source 16 in FIG. 2. If $e^+$ and/or $e^-$ are moving at the moment of their mutual annihilation, the two annihilation photons emitted from this annihilation need not be emitted at an angle of exactly 180°. However, the departure from 180 degrees is generally small compared to the spatial resolution of the detectors and would have little effect upon the data registered by the instrument. Because $^{22}$Na is the preferred radioactive positron source, the e$^+$ is a low energy positron (maximum or end-point energy 545-keV).

Positrons are emitted with a continuous distribution of energies ranging from nearly zero to a maximum or end-point energy. The distribution of energies peaks at about half-maximum energy. The half-maximum energy is used to calculate a mean distance traveled by positrons from the site of their emission in a given material before coming to rest. If $^{22}$Na were encased in aluminum, the mean distance traveled would be about 0.5 millimeters from its point of emission in the source. If, as is preferred, $^{22}$Na is encased in thin plastic, preferably thin-walled Tygon tubing, the mean distance in plastic is about 0.2 millimeters from its point of emission within the source container.

This distance traveled prior to its annihilation has a negligible effect on the spatial resolution on the grounds elucidated just above. Using a point source, or a narrow line source (e.g., a millimeter or less in diameter) positioned perpendicularly to the plane of the scan, allows the straight line between the points of detection in the opposing pair of detectors and which also passes through the annihilation radiation source to be well-defined, making it possible for the breadth of the source, to contribute only negligibly to the spatial resolution of the tomographic image of the object 18.

A "point" source is relatively easy to fabricate. The source material can be put into solution. For example, $^{22}$NaCl may be used in the form of an aqueous solution. A small drop of the solution may be deposited on a thin sheet of Mylar or other plastic film using a narrow-bore pipette, and dried under a heat lamp. This constitutes a "point" source. However, a problem arises should a reasonably large amount of radioactive source material be required, as the "point" source will broaden considerably after several pipette drops are loaded on the same "point".

To make a line source, the source solution, in as high a concentration as needed, is loaded into a small section of tubing (preferably Tygon), preferably 1 mm inside diameter and 1 cm long, crimped at one end. When sufficient source solution is loaded in, the open end of the tube can be crimped. This source, now sealed, may be placed in a thin-walled aluminum or stainless steel tube whose inside diameter just matches the outside diameter of the tubing as a "slip fit", thus keeping the source straight and aligned. This tube is then placed in a collimator (e.g., lead or tungsten) which allows only those annihilation photons directed into the desired dual fan-beam and aimed at the detectors to emerge from the collimator. The other photons emitted by the source are totally absorbed within the collimator. The line source is of a length approximately equal to the dimension of the detectors along a parallel direction.

Higher energy positrons, such as those emitted from a $^{68}$Ga source (maximum energy 1900-keV), may travel a mean distance of about 1.4 millimeters (when encased in plastic) from their site of origin in the source container before coming to rest and annihilating with electrons. If $^{68}$Ga were, instead, encased in aluminum, its positrons would travel a mean distance of about 4.5 millimeters. This essentially enlarges the effective expanse of the source and can degrade the spatial resolution attainable using such a source by up to a factor of about 7 compared to that achievable using a $^{22}$Na source. Of course, this resolution may still be good enough for the purpose of measuring density, particularly when compared with the resolution of positron emission tomography (PET), where the PET technique is used simply to locate the site at which positrons are emitted from a radioactive positron-emitting source introduced into the subject for the purpose of the scan.

The two photons generated by mutual annihilation of the positron and electron are of a combined energy represented by the original masses of these particles. Because all positrons and electrons are of identical mass, regardless of their original energy, the annihilation photons are all of nearly identical energy (511-keV). The energy of photons generated by annihilation when the positron is not at rest departs very slightly from 511-keV, so that any beam hardening is negligible when positrons are emitted from almost all positron-emitting radioactive sources. Therefore, beam hardening in these annihilation radiation cases is essentially not discernible.

The lower the energy of the impinging photons, the higher the fraction of them absorbed by an object. Thus, use of a stream of 1500-keV photons is less informative than that of a stream of 500-keV photons simply because a smaller fraction of 1500-keV photons are absorbed by the object than would be the case for 500-keV photons, as the absorptivity for 1500-keV photons is half that of 500-keV photons. As such, the sensitivity of 1500-keV photons to the density of material within an object would be reduced considerably over that pertaining to 500-keV photons.

The absorptivity of an object (if the object is made up of the elements of atomic weight between carbon and tin), when impinged upon by photons of a discrete energy between 500-keV and 1500-keV depends only on the density of the object for a given thickness of the part of the object scanned. The thickness of the entire object need not be held constant in tomographic applications (as is required in SPA), as the resulting pixel dimensions are automatically of equal dimensions.

Figure 6:
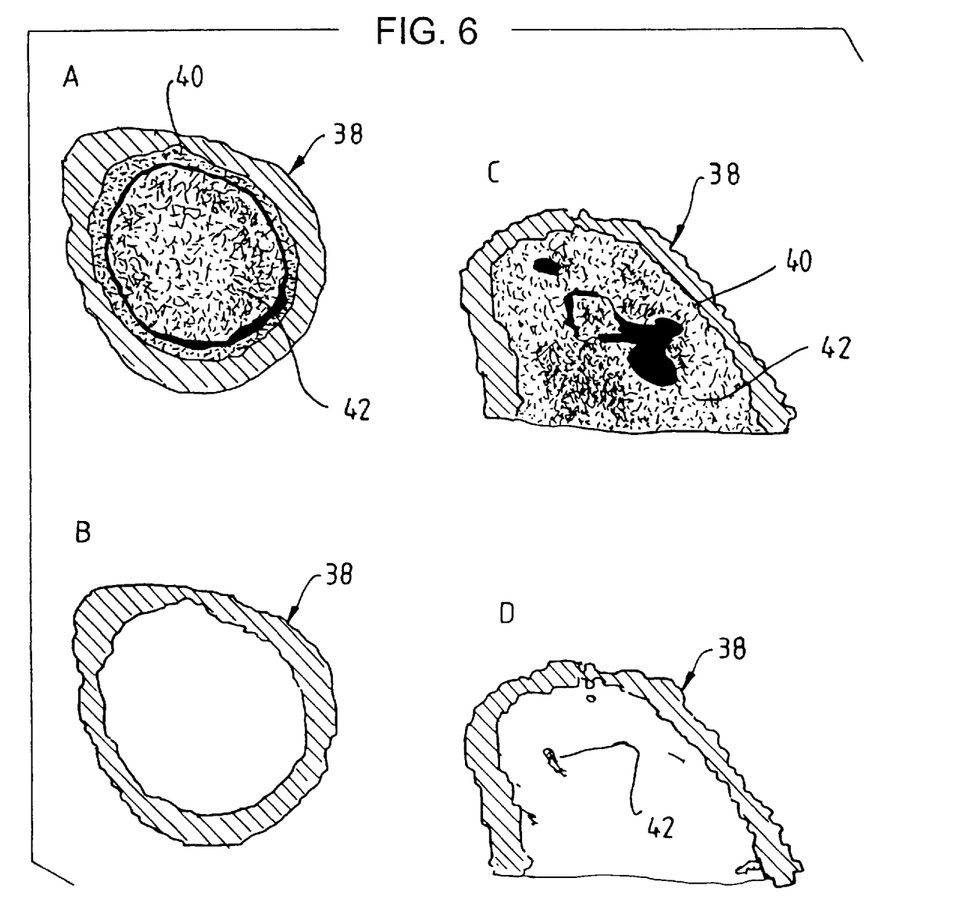
FIG. 6 shows tomographic views of in vitro bone obtained using an embodiment of the invention.

FIG. 6 shows two tomographic views of bone samples scanned by an embodiment of the invention. Panels A and C are two samples of bone illustrating that bone cortex 38, trabecular bone 40, and marrow 42 are distinguishable. Panel B illustrates that computer manipulation allows the cortex 38 seen in Panel A to be viewed alone, with the trabecular bone 40 and marrow 42 hidden from view. Similarly, Panel D illustrates that cortex 38 and trabecular bone 40 may be viewed with marrow hidden from view. Panels A and B are of a steer shinbone. Panels C and D are of a steer bone cut longitudinally.

In a preferred embodiment of the invention, $^{22}$Na is used as the radioactive source, although positron-emitting sources, such as $^{11}$C, $^{14}$O, $^{15}$O, $^{17}$F, $^{18}$F, $^{19}$Ne, $^{52}$Fe, $^{62}$Zn, $^{64}$Cu, and $^{68}$Ga, could also be employed. Most of these sources are less preferred than $^{22}$Na due to unfavorable properties, including too short a radioactive half-life, too large a percentage of the decay proceeding by non-positron emission modes, expensive production, and high energy positron emission (for instance, 1900-keV maximum energy for $^{68}$Ga as compared with 545-keV for $^{22}$Na).

Using the decay of $^{22}$Na to $^{22}$Ne to generate positrons and, thus, annihilation photons has several advantages. More than 90% of the $^{22}$Na radioactive decays proceed by positron emission accompanied by a single extraneous gamma ray (1275-keV), so that radiation exposure to the patient is limited to as close to that which is useful for positron annihilation radiation absorptivity densitometry. The positrons are of relatively low energy, so they come to rest quickly (generally before annihilation). This quick stop (within a mean distance of about 0.2 millimeters) results in both a decreased departure from back-to-back emission of the annihilation radiation photons and a spatially better defined source of annihilation radiation. $^{22}$Na has a long half-life (2.6 years), which reduces the need for frequent source replacement as compared with present radioactive source densitometers (SPA and DPA). Finally, at the activity levels required, $^{22}$Na is a moderately priced radioactive source.

All else being equal, the higher the activity level, the shorter will be the scanning time needed for the same precision in measurement. For scanning, say, airline baggage, there is essentially only an instrumental limit to the activity level that might be utilized, as the radiation does not pass through a human being, and the radiation "dose" to baggage is of no consequence, while speed of scanning is probably a major criterion. For baggage scanning, a source of 1 Curie ($3.7 \times 10^{10}$ decays per second=$3.7 \times 10^4$ MBq (mega Becquerel)) or even greater could be used to advantage. Indeed, the broadest range of activity levels which might be used, per source, would be in the range of about $3.7 \times 10^2$ MBq to $7.4 \times 10^5$ MBq. For living human or animal bone scanning, a smaller source activity level could be utilized (for example, roughly $3.7 \times 10^2$ MBq) with only minor radiation dose to the person during a typical bone scan (as low as of the order of 30 $\mu$Sv=30 micro Seivert), somewhat lower than pertains for most SPA, DPA, and DEXA bone scanners in present use (about 100 $\mu$Sv). All of these radiation doses are considered "safe" levels. In comparison, the radiation dose to the patient using CT is generally much higher, ranging from about $10^3$ $\mu$Sv to as high as about $4 \times 10^4$ $\mu$Sv. The radiation dose to the patient for a given source activity level depends upon the angle of the fan-beam required, the anatomical section of the body being scanned, the diameter of the object being scanned, the distance of the object from the source, the distance from the detectors to the source, the time duration of the scan, etc. In a clinical prototype of the present invention, the activity level will probably not have to exceed $3.7 \times 10^2$ Mbq by very much to complete a typical bone scan in a reasonable time (say, 5–15 minutes). In a commercial clinical instrument, it might be necessary to increase this source activity level about a factor of 5 or greater, with the radiation dose to the patient still well under the very conservative international health dose limits recommended, even if scans are required several times a year for a given patient.

While particular embodiments of the invention have been shown and described, it will be obvious to those skilled in the art that various changes and modifications may be made therein without departing from the spirit and scope of the invention and, therefore, it is intended in the appended claims to cover all such changes and modification which fall within the true spirit and scope of the invention.

What is claimed is:

1. A densitometer for determining the density distribution and variation of density of an object comprising:
    at least one source of oppositely directed photons emitted simultaneously and with the same selected energy to which materials forming the object present substantially the same absorptivity;
    at least one pair of photon detectors to detect photons emitted in coincidence from the photon source, with the source of oppositely directed photons located on a line passing through each detector of the detector-pair at its point of photon detection;
    means for positioning an object whose density is to be measured by the densitometer between the photon source and one of the photon detectors to thereby block that photon detector;
    means for varying the relative angular orientation between the object and the line passing through the source and the pair of detectors; and
    means for determining the distribution and variation of density of the object by comparing the number of coincident photons detected by the blocked and unblocked detectors along a plurality of paths of different angular orientations.

2. The densitometer of claim 1 in which the density to be determined is chosen from the group consisting of: volumetric density, areal density, and lineal density.

3. The densitometer of claim 1 in which the object is chosen from the group consisting of: in vivo bone in a human or animal, in vitro bone in a human or animal, a prosthetic device implanted in an in vivo bone, or bone material adjacent to a prosthetic device implanted in an in vivo bone.

4. The densitometer of claim 1 in which the object is chosen from the group consisting of:
    a sealed parcel, an object with a foreign object embedded therein, an object containing a hidden void, and an object which is hollow in part with the hollow filled partially or wholly with material of density different from that of the object.

5. The densitometer of claim 1 including means for presenting a planar view of the object.

6. The densitometer of claim 1 including means for presenting a 3-D view of the object.

7. The densitometer of claim 1 including a multiplicity of pairs of photon detectors.

8. The densitometer of claim 1 in which the photon source emits photons in a dual fan-beam geometry.

9. The densitometer of claim 1 in which the photon source is $^{22}$Na which produces photons arising from the mutual annihilation of a positron and an electron giving rise to two photons each of 511-keV energy emitted in opposite directions.

10. The densitometer of claim 1 including at least a pair of opposing arrays of detectors.

11. The densitometer of claim 1 including a multiplicity of pairs of opposing arrays of detectors and separate photon sources associated with each pair of opposing arrays of detectors.

12. The densitometer of claim 1 in which the object is stationary while the varying means are operated.

13. The densitometer of claim 1 in which the line passing through the source and the pair of detectors is stationary while the varying means are operated.

14. The densitometer of claim 1 in which the means for determining the distribution and variation of density comprises a computer programmed to generate a tomographic image made up of pixels representing density $\rho$ calculated from $$\rho = \frac{\ln(B/A)}{-\lambda x}$$

where B=the number of coincident photons reaching the blocked detector, A=the number of photons initially emitted toward the blocked detector, $\lambda$=the known absorptivity of the material within the pixel to the photon energy employed, and x=the length of a side of the pixel.

15. The densitometer of claim 1 in which the photon source is chosen from the group consisting of $^{22}$Na, $^{11}$C, $^{14}$O, $^{15}$O, $^{17}$F, $^{18}$F, $^{19}$Ne, $^{52}$Fe, $^{62}$Zn, $^{64}$Cu, and $^{68}$Ga.

16. The densitometer of claim 1 in which the selected energy is between about 350-keV and about 1500-keV.

17. A densitometer for determining the density distribution and variation of density of an in vivo bone in a human or an animal comprising:
- at least one source of oppositely directed photons emitted simultaneously and with the same selected energy to which materials forming the bone and its surrounds present substantially the same absorptivity, the photon source being $^{22}$Na;
- at least one pair of photon detectors to detect photons emitted in coincidence from the photon source, with the source of oppositely directed photons located on a line passing through each detector of a pair at its point of photon detection;
- means for positioning the bone whose density is to be measured by the densitometer between the photon source and one of the photon detectors to thereby block that photon detector;
- means for varying the relative angular orientation between the bone and the line passing through the source and the pair of detectors at the points of detection; and
- means for determining the distribution and variation of density of the bone by comparing the number of coincident photons detected by the blocked and unblocked detectors along a plurality of paths of different angular orientations.

18. A densitometer for determining the density distribution and variation of density of an object, comprising:
- at least one source of photons with a selected energy to which materials forming the object present substantially the same absorptivity for positioning outside of the object;
- at least one photon detector for detecting the photons emitted from the photon source and which pass through the object;
- means for positioning the object whose density is to be measured by the densitometer between the photon source and the photon detector;
- means for varying the relative orientation between the object and a line passing through the photon source and the photon detector at its point of photon detection;
- at least one photon detector for detecting emitted photons from the source which do not pass through the object; and
- means for determining the number of photons detected by the detector for detecting photons which do not pass through the source, to provide a measure of the number of photons actually emitted along the said line, and for comparing the number of actually emitted photons with the number of photons detected by the detector for detecting photons which pass through the object, to provide measure of the density distribution and variation of density of the object.

19. A method of determining the density distribution and variation of density of an object comprising the steps of:
- providing at least one source of oppositely directed photons to be emitted simultaneously and with the same selected energy to which materials forming the object present substantially the same absorptivity;
- providing at least one pair of photon detectors to detect photons emitted in coincidence from the photon source, with the source of oppositely directed photons located on a line passing through each detector of the detector-pair at its point of photon detection;
- positioning an object whose density is to be measured by the densitometer between the photon source and one of the photon detectors to thereby block that photon detector;
- varying the relative angular orientation between the object and the line passing through the source and the pair of detectors; and
- determining the distribution and variation of density of the object by comparing the number of coincident photons detected by the blocked and unblocked detectors along a plurality of paths of different angular orientations.

20. A method of determining the density distribution and variation of density of an object, comprising the steps of:
- providing at least one source of photons with a selected energy to which materials forming the object present substantially the same absorptivity for positioning outside of the object;
- providing at least one photon detector for detecting the photons emitted from the photon source and which pass through the object;
- positioning the object whose density is to be measured by the densitometer between the photon source and the photon detector;
- varying the relative orientation between the object and a line passing through the photon source and the photon detector at its point of photon detection;
- providing at least one photon detector for detecting emitted photons from the source which do not pass through the object; and
- determining the number of photons detected by the detector for detecting photons which do not pass through the source, to provide a measure of the number of photons actually emitted along the said line, and comparing the number of actually emitted photons with the number of photons detected by the detector for detecting photons which pass through the object, to provide a measure of the density distribution and variation of density of the object.

* * * * *